United States Patent Office 2,913,401
Patented Nov. 17, 1959

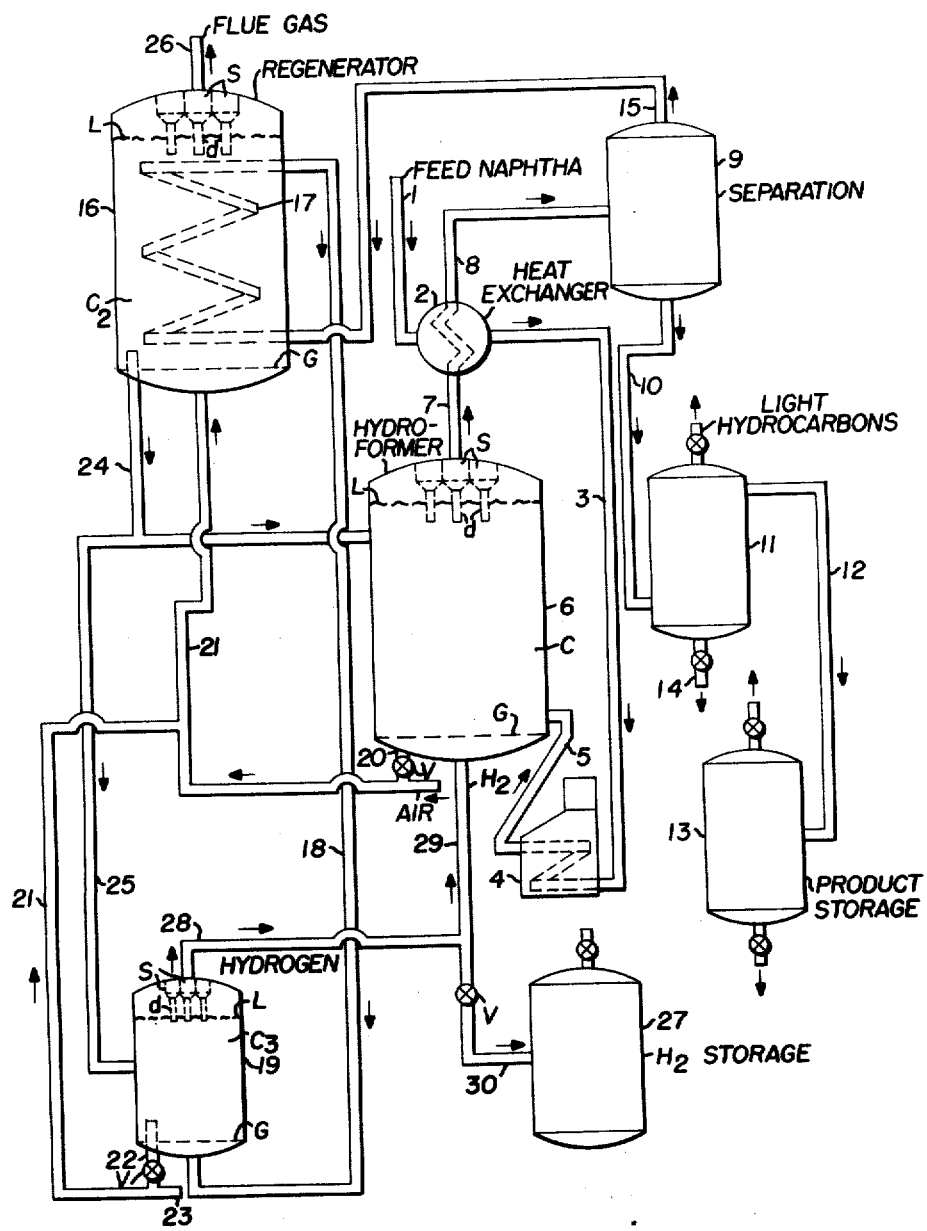

2,913,401

HYDROGEN PRODUCTION AND HYDRO-FORMING

John Weikart and Robert C. Morbeck, Westfield, N.J., assignors to Esso Research and Engineering Company, a corporation of Delaware Application April 19, 1957, Serial No. 653,826

10 Claims. (Cl. 208—136)

The present invention relates to a method of producing very pure hydrogen. More particularly, the present invention relates to a method for producing hydrogen of a high degree of purity from the recycle and/or tail gas of a fluidized catalyst hydroforming operation.

The demand for hydrogen in many industries has greatly increased in recent years. This is particularly true in petroleum refineries where processes have been developed for hydrotreating gasoline, heating oils and other petroleum products in order to remove sulfur therefrom. The cost of hydrogen production, according to previous methods, has restricted its use in large commercial quantities. In recent years, hydroforming of naphtha has produced, and made available in many refineries, an excess of hydrogen over and above that required for the hydroforming operation. In refineries which have plants for hydroforming naphthas employing fixed beds of catalyst containing platinum, the hydrogen or recycle gas as it is commonly called has a hydrogen content of from 85 to 90%. On the other hand, many refineries now have hydroforming plants which utilize the fluidized catalyst technique using a catalyst, such as molybdenum oxide carried on alumina. The hydrogen-containing recycle gas from the latter type of process is of a hydrogen concentration of the order of 55 to 75%. The present invention relates to a method of treating this latter type of recycle or hydrogen-containing gas of relatively low concentration in order to increase its hydrogen content approaching 100%. Also it is an important feature of this invention to treat the recycle gas containing methane, natural gas and other light hydrocarbons added from an extraneous source to increase the yield of hydrogen.

The commercial fluidized catalyst hydroforming units are essentially two-vessel systems comprising a reactor and a catalyst regenerator interconnected by means of transfer lines to permit catalyst to flow from the reactor to the regenerator where it is treated with an oxygen-containing gas to remove carbonaceous and other contaminating deposits and to be thereafter returned to the reactor for further use in the hydroforming reaction. The present invention involves the use of a third vessel wherein the tail gas and/or the recycle gas plus normally gaseous extraneous hydrocarbons are treated, utilizing the same catalyst as that present in the hydroforming zone whereupon the light hydrocarbons added and present in the tail gas and/or the recycle gas undergo cracking with the formation of hydrogen. The hydrogen thus produced is of a high degree of purity and this is a very important attribute since in sweetening a sour hydrocarbon oil by hydrosulfurization, the purity of the hydrogen is of considerable importance, as it is in other processes, such as ammonia synthesis. It is pointed out, for instance, that when hydrogen of the purity obtainable by the present invention is used in hydrotreating a sulfur-containing hydrocarbon oil, important economies are effected in that the hydrogen feed rate to the hydrotreating process may be substantially increased. Also catalyst life is extended and/or the on-stream phase may be continued for a longer time period since the high purity hydrogen represses carbon formation on the catalyst.

The catalyst in the treating zone, where hydrogen is formed, becomes contaminated with carbonaceous deposits and the thus contaminated catalyst may be regenerated in the same zone admixed with fouled catalyst withdrawn from the hydroforming zone.

It is pointed out that in a commercial fluidized catalyst hydroforming system all of the heat released in the regenerator by burning of the carbonaceous deposits on the catalyst cannot be transferred to the reaction zone due to the fact that there is a limitation on the catalyst to oil ratios entering the hydroforming zone to a value of about 1 to 2. Therefore, in conventional practice cooling coils are submerged in the fluidized bed of catalyst undergoing regeneration to abstract heat from the catalyst, which heat is withdrawn from the system.

The present invention includes means for utilizing this heat and retaining it in the system by causing the tail gas and/or the recycle gas plus added hydrocarbon gas to flow through coils in the bed of catalyst undergoing regeneration wherein the said gases are heated and then passed to the hydrogen producing zone. In this manner heat normally withdrawn from the hydroforming system is retained within the system, thus avoiding the necessity of including an additional furnace in the system for heating recycle gas prior to its entering the hydroforming zone. In other words, in the commercial hydroforming operation the hot raw product, of course, containing free hydrogen is cooled to a temperature of about 100° F. and a hydrogen-containing gas is separated from the liquid product for recycle to the hydroforming zone. In current practice this recycled hydrogen-containing gas is heated in a separate furnace in sufficient quantity to supply over 50 percent of the heat required in the highly endothermic reaction of hydroforming. The present invention provides means for eliminating the recycle gas heating furnace and heating this gas in the regenerator.

The principal object of the present invention is to produce a hydrogen of a relatively high degree of purity by a process at a cost which is cheaper than conventional hydrogen manufacturing methods.

Another object of the present invention is to produce hydrogen in connection with a fluid catalyst hydroforming operation, which produced hydrogen is of high purity and which, when utilized in the hydroforming zone, results in the formation of a reformate of increased octane quality over and above the quality of a reformate formed under the same conditions except that the hydrogen-containing gas fed to the hydroforming zone is of lower hydrogen concentration.

Other objects of the invention will be apparent from the ensuing description and claims.

In the accompanying drawing there is set forth diagrammatically the essential elements of a plant in which the present invention may be carried into effect.

Referring in detail to the drawing, naphtha to be hydroformed enters the present system through line 1 and thence passes through a heat exchanger 2 where it is preheated by the hot product from a hydroforming zone to a temperature of from about 300° to 400° F., thence withdrawn from heat exchanger 2 via line 3 and charged to an oil heating furnace 4 wherein the said oil is heated to a temperature of from about 875° to 950° F., thence withdrawn through line 5 and charged to a hydroforming zone 6 containing a fluidized bed of catalyst C, which catalyst extends from a gas distributing means, such as a grid G, to an upper dense phase level L. According to conventional practice, cold recycle gas from the product recovery system is heated to about 1200° to 1300° F. in a furnace and fed to the hydroforming zone.

According to the present invention, cold recycle gas is reheated by:

(1) Causing it to pass in heat exchange relationship in a coil embedded in catalyst undergoing regeneration, (2) By mixing cold recycle gas with the hot products (about 1300° F.) issuing from the hydrogen producing zone, (3) By charging the cold recycle gas to a hydrogen producer, i.e., by-passing the regenerator.

In each case it will be noted a separate recycle gas furnace is omitted.

Under otherwise known conditions of temperature and pressure, feed rates and catalyst to oil ratios, the desired hydroforming takes place in hydroformer 6 and the crude product passes from the dense fluidized bed of catalyst C to a catalyst disengaging space located between L and the top of the reactor in which catalyst disengaging space the main bulk of the catalyst is separated from the hydrogen and raw product and is gravitated toward the bed C. The raw vapors proceed upwardly and are forced through a plurality of "cyclones" S wherein entrained catalyst is separated from the oil vapors and the gas and returned to the bed of catalyst C through dip pipes $d$. The effluent passes from reactor 6 through line 7, thence through heat exchanger 2 and additional cooling means not shown where it is cooled to a temperature of about 100° F. and thereafter the cooled product is passed via line 8 into a separation zone 9. In separation zone 9 the normally liquid hydrocarbons are withdrawn as bottoms through line 10 and thence charged to a fractional distillation column 11 from which column the main product is withdrawn as a side stream through line 12 and delivered to a product storage drum 13. High boiling material is withdrawn as bottoms from fractionator 11 through line 14. This material withdrawn through line 14 normally constitutes about 5% of the product based on feed and since it boils above the boiling range of the desired reformed naphtha, it may be treated by subjecting it to cracking, hydrodealkylation and similar known treatments to convert it to a useful product.

Referring again to separator 9, the hydrogen-containing gas, or recycle gas as it is commonly called, is withdrawn overhead from the said separator through line 15. As previously stated, normally the concentration of hydrogen in this gas is from 65 to 75 volume percent, the remainder being mostly normally gaseous hydrocarbons, in other words, $C_1$–$C_4$ hydrocarbons with some higher boiling material. Also, as previously stated, this gas is recovered from the separator at a temperature of about 100° F. and, according to conventional practice, it is passed through a recycle gas furnace in order to heat it to a temperature of 1100° to 1200° F. In a conventional two-vessel hydroforming plant this reheated recycle gas, as indicated, supplies over 50 percent of the heat required in the highly endothermic hydroforming reaction. According to the present invention, the recycle gas furnace is eliminated and the gas is heated by causing it to flow first through a catalyst regenerator 16 containing a fluidized bed of catalyst $C_2$ undergoing regeneration wherein the said gas is heated to a temperature of 1100° to 1200° F. As shown in the drawing, the said gas flows through a coil 17 imbedded in the hot bed of catalyst $C_2$. The reheated recycle gas is then withdrawn from the regenerator through line 18 and transferred to hydrogen producing zone 19 containing a fluidized bed $C_3$ of the same catalyst as is present in reformer 6, the gas being caused to flow upwardly in contact with the bed of catalyst at a superficial velocity sufficient to maintain the bed of catalyst in a fluidized state. Under conditions more fully set forth hereinafter the hydrocarbons in the recycle gas undergo cracking with the formation of hydrogen and coke and the product passes from the dense fluidized bed into a solid catalyst disengaging space disposed between L and the top of the reactor wherein the main bulk of the catalyst is separated from the gasiform material and gravitated toward the dense fluidized bed $C_3$. Before the gasiform material is withdrawn from the system, it is forced through one or more "cyclones" S wherein entrained catalyst is separated from the gasiform material and returned to the bed $C_3$ through one or more dip pipes $d$. The reheated and enriched recycle gas is withdrawn from hydrogen producer 19 via line 28 and a portion of this gas is charged via line 29 to the bottom of the hydroforming zone 6, as previously noted. Another portion of the enriched hydrogen is withdrawn through line 30 and conducted to hydrogen storage 27 or sent directly to hydrogen consuming process units.

As previously noted, the catalyst in hydroformer 6 becomes contaminated with carbonaceous and other deposits and to remove these deposits the catalyst is withdrawn through a standpipe 20 carrying a valve V and charged to a stream of air flowing in line 21 where it is formed into a suspension and conveyed into regenerator 16 where it is formed into a dense fluidized bed where carbonaceous and other contaminating deposits are burned off the catalyst. In like manner contaminated catalyst is withdrawn from the hydrogen producing zone 19 via standpipe 22 carrying a valve V and charged into a stream of air flowing in line 23 wherein the catalyst is formed into a suspension and conveyed to line 21 and thereafter transported into regenerator 16. Standpipes 20 and 22 are provided with gas taps (not shown) in order to impart fluidity to the downflowing catalyst and also to strip out occluded or adsorbed gasiform and vaporiform material. The regenerated catalyst is returned to reformer 6 and hydrogen producer 19 by any suitable means as by transfer lines 24 and 25 provided with suitable control valves. The combustion fumes resulting from the regeneration in 16 are withdrawn overhead via line 26 after having been passed through one or more "cyclones" S to remove entrained catalyst, which separated catalyst is returned to the bed of catalyst $C_2$ through dip pipes $d$. The hot fumes or flue gas in line 26 may be passed through a waste heat boiler to recover its sensible heat and in like manner the hot hydrogen gas stored in 27 may be manipulated so as to recover sensible heat, for example, the hydrogen in line 30 may be heat exchanged with the feed naphtha in line 3 to add heat to the said naphtha thus reducing the required capacity of furnace 4 to heat the feed naphtha to reaction temperatures.

In order to describe the invention more fully, the following further information is set forth.

*Conditions in hydroformer 6*

| | |
|---|---|
| Catalyst composition, weight percent | 10% $MoO_3$, 90% $Al_2O_3$. |
| Temperature, ° F | 920. |
| Pressure, p.s.i.g | 200. |
| Oil feed rate, w./hr./w | 0.284. |
| Catalyst oil ratio | 1.2/1. |
| S.c.f. of $H_2$ per barrel of feed | 5600. |
| Concentration of hydrogen, volume percent | 85. |

*Inspection of feed*

| | |
|---|---|
| Boiling range | 5% at 195° F., 50% at 256° F., 95% at 324° F. |
| Naphthenes, volume percent | 34. |
| Aromatics, volume percent | 9. |
| Paraffins, volume percent | 57. |
| S, weight percent | 0.003. |
| Octane number, CFFR | 47. |

Inspection of product

| | |
|---|---|
| Naphthenes, vol. percent | 10 |
| Aromatics, vol. percent | 33 |
| Paraffins, vol. percent | 57 |
| S, wt. percent | ca. 0.0001 |
| Octane number, CFFR | 95 |

Conditions in hydrogen producer 19

| | |
|---|---|
| Catalyst | Same as in hydroformer 6. |
| Temperature, °F | 1300. |
| Pressure, p.s.i.g | 200. |
| Gas feed rate, s.c.f./c.f.cat. vol./hr | 80. |
| Concentration of hydrogen in feed, vol. percent | 50–85.[1] |
| Concentration of hydrogen in product | 85% approximately. |

[1] Includes extraneous methane or light gases. Can also be 0% with pure $CH_4$ or light gas.

Conditions in regenerator

| | |
|---|---|
| Temperature, °F | 1300–1400 |
| Pressure, p.s.i.g | 200 |

With respect to the foregoing conditions, it is pointed out that the hydroforming and catalyst regeneration temperatures are conventional except for the fact that the purity of the hydrogen entering the hydroformer is much greater than in the conventional operation, since the recycle gas has been enriched in hydrogen, according to the procedure previously described. With respect to the hydrogen enriching step carried out in 19, it is pointed out that the temperature here may vary from 1200° to 1400° F. and the pressure from about 50 to 400 p.s.i.g. and the gas residence time may vary from 40 to 160 s.c.f./h./c.f. of reactor. It is also pointed out that the hydrogen in line 29, which is at an elevated temperature and under system pressure, may be cooled and utilized to hydrodesulfurize the feed naphtha prior to the hydroforming of the latter, thus effecting further economies in the present integrated process, since heating a hydrogen treated gas and pressurizing the latter is avoided.

To recapitulate briefly, the present invention involves an integrated process wherein hydrogen of high purity is manufactured in conjunction with a naphtha hydroforming process carried out in the presence of a fluidized catalyst, such as molybdenum oxide on alumina, by adding an additional fluidized catalyst reactor wherein tail gas from the hydroformer, the recycle gas and also natural gas are fed to the additional reactor containing the same catalyst as is present in the hydroforming zone whereby the hydrocarbons contained in the gas are cracked with the production of hydrogen at temperatures above those prevailing in the hydroforming zone. Many important economies are effected by the present invention and these include elimination of the usual separate recycle gas heating furnace, elimination of the cooling coil embedded in the bed of catalyst undergoing regeneration in the conventional operation which abstracts heat from the system and utilizing this heat and retaining it in the system to preheat the recycle gas, regenerating the fouled catalyst from the hydroforming zone and the cracking zone in the same regenerator and producing incremental hydrogen by feeding to the cracking zone gaseous hydrocarbons from an extraneous source.

Another advantage of the present invention is that an improvement in octane quality of the hydroformed product is attainable due to the fact that the hydrogen feed to the hydroforming zone has a greater purity than the hydrogen thus fed in the conventional operation employing a VI group metal oxide catalyst.

Many modifications will be apparent to those who are familiar with the art to which the present invention pertains.

What is claimed is:

1. The method of hydroforming naphthas and producing hydrogen which comprises contacting a naphtha fraction and hydrogen-rich gas with a dense, fluidized bed of Group VI metal oxide catalyst maintained at elevated temperatures and pressures necessary to hydroform the naphtha in a hydroforming reaction zone, withdrawing vaporous reaction products from the hydroforming reaction zone, cooling the reaction product to separate normally liquid products from hydrogen-rich recycle gas, continuously withdrawing catalyst from the hydroforming reaction zone and transferring the withdrawn catalyst to a separate regeneration zone, contacting the catalyst in the regeneration zone with an oxygen-containing regeneration gas to burn carbonaceous deposits therefrom at temperatures substantially above hydroforming reaction zone temperature, withdrawing hot regenerated catalyst from the regeneration zone and contacting the hot regenerated catalyst with the hydrogen-rich recycle gas to crack light hydrocarbons contained therein to high purity hydrogen-rich product gas in a separate cracking zone at above the hydroforming temperature, withdrawing said hydrogen-rich product gas from the cracking zone and charging part of the same to the hydroforming reaction zone and recycling catalyst contaminated with carbonaceous deposits from the said cracking zone to said regeneration zone, and continuously recycling catalyst from said regeneration zone to said hydroforming reaction zone.

2. The method of hydroforming naphthas and producing hydrogen which comprises contacting a naphtha fraction and hydrogen-rich gas with a dense, fluidized bed of Group VI metal oxide catalyst maintained at elevated temperatures and pressures necessary to hydroform the naphtha in a hydroforming reaction zone, withdrawing vaporous reaction products from the hydroforming reaction zone, cooling the reaction product to separate normally liquid products from hydrogen-rich recycle gas, continuously withdrawing catalyst from the hydroforming reaction zone and transferring the withdrawn catalyst to a separate regeneration zone, contacting the catalyst in the regeneration zone with an oxygen-containing regeneration gas to burn carbonaceous deposits therefrom at temperatures substantially above hydroforming reaction zone temperature, passing the hydrogen-rich recycle gas in indirect heat exchange relation to the catalyst undergoing regeneration to control the temperature of regeneration and heat the hydrogen-rich recycle gas, withdrawing hot regenerated catalyst from the regeneration zone and contacting the regenerated catalyst with the hot hydrogen-rich recycle gas heated by the indirect heat exchange to crack light hydrocarbons contained therein to hydrogen in a separate cracking zone at 1200° to 1400° F., and recycling contaminated catalyst from the said cracking zone to said regeneration zone.

3. The method of hydroforming naphthas and producing hydrogen which comprises contacting a naphtha fraction and hydrogen-rich gas with a dense, fluidized bed of Group VI metal oxide catalyst maintained at elevated temperatures and pressures necessary to hydroform the naphtha in a hydroforming reaction zone, withdrawing vaporous reaction products from the hydroforming reaction zone, cooling the reaction products to separate normally liquid products from hydrogen-rich recycle gas, continuously withdrawing catalyst from the hydroforming reaction zone and transferring the withdrawn catalyst to a separate regeneration zone, contacting the catalyst in the regeneration zone with an oxygen-containing regeneration gas to burn carbonaceous deposits therefrom at temperatures substantially above hydroforming reaction zone temperature, passing the hydrogen-rich recycle gas in indirect heat exchange relation to the catalyst undergoing regeneration to control the temperature of regeneration and form heated hydrogen-rich recycle gas, withdrawing hot regenerated catalyst from the regeneration zone and contacting part of the hot regenerated catalyst with the heated hydrogen-rich recycle gas to crack light hydrocarbons contained therein to hydrogen in a separate cracking zone at a temperature above the hydroforming zone tempearture and recycling contaminated catalyst from the said cracking zone to said regeneration zone, and continuously recycling another part of the hot regenerated catalyst withdrawn from said regeneration zone to said hydroforming reaction zone.

4. The method of hydroforming naphthas and producing hydrogen which comprises contacting a naphtha fraction and hydrogen-rich gas with a dense, fluidized bed of Group VI metal oxide catalyst maintained at elevated temperatures and pressures necessary to hydroform the naphtha in a hydroforming reaction zone, withdrawing vaporous reaction products from the hydroforming reaction zone, cooling the reaction products to separate normally liquid products from hydrogen-rich recycle gas, continuously withdrawing catalyst from the hydroforming reaction zone and transferring the withdrawn catalyst to a separate regeneration zone, contacting the catalyst in the regeneration zone with an oxygen-containing regeneration gas to burn carbonaceous deposits therefrom at temperatures substantially above hydroforming reaction zone temperature, passing the hydrogen-rich recycle gas in indirect heat exchange relation to the catlyst undergoing regeneration to control the temperature of regeneration and heat the hydrogen-rich recycle gas, withdrawing hot regenerated catalyst from the regeneration zone and contacting the regenerated catalyst with the hot hydrogen-rich recycle gas heated in said indirect heat exchange to crack light hydrocarbons contained therein to hydrogen in a separate cracking zone at a temperature above the hydroforming temperature, withdrawing hydrogen-rich product gas from the cracking zone and charging part of the same to the hydroforming reaction zone, and recycling contaminted catalyst from the said cracking zone to said regeneration zone.

5. The method of hydroforming naphthas and producing hydrogen which comprises contacting a naphtha fraction and hydrogen-rich gas with a dense, fluidized bed of Group VI metal oxide catalyst maintained at elevated temperatures and pressures necessary to hydroform the naphtha in a hydroforming reaction zone, withdrawing vaporous reaction products from the hydroforming reaction zone, cooling the reaction product to separate normally liquid products from hydrogen-rich recycle gas, continuously withdrawing catalyst from the hydroforming reaction zone and transferring the withdrawn catalyst to a separate regeneration zone, contacting the catalyst in the regeneration zone with an oxygen-containing regeneration gas to burn carbonaceous deposits therefrom at temperatures substantially above hydroforming reaction zone temperature, passing the hydrogen-rich recycle gas in indirect heat exchange relation to the catalyst undergoing regeneration to control the temperature of regeneration and heat the hydrogen-rich recycle gas, withdrawing hot regenerated catalyst from the regeneration zone and contacting the hot regenerated catalyst with hot hydrogen-rich recycle gas heated by said indirect heat exchange to crack light hydrocarbons contained in said gas to hydrogen in a separate cracking zone at a temperature higher than that of the hydroforming, withdrawing hydrogen-rich product gas from the cracking zone and charging part of the same to the hydroforming reaction zone and recycling contaminated catalyst from the said cracking zone to said regeneration zone, and continuously recycling regenerated catalyst from said regeneration zone to said hydroforming reaction zone.

6. The process as defined in claim 1 in which extraneous light hydrocarbons are added to the hydrogen-rich recycle gas charged to the cracking zone.

7. The process as defined in claim 2 in which extraneous light hydrocarbons are added to the hydrogen-rich recycle gas charged to the cracking zone.

8. The process as defined in claim 3 in which extraneous light hydrocarbons are added to the hydrogen-rich recycle gas charged to the cracking zone.

9. The process as defined in claim 4 in which extraneous light hydrocarbons are added to the hydrogen-rich recycle gas charged to the cracking zone.

10. The process as defined in claim 5 in which extraneous light hydrocarbons are added to the hydrogen-rich recycle gas charged to the cracking zone.

References Cited in the file of this patent

UNITED STATES PATENTS

| | | |
|---|---|---|
| 2,284,603 | Belchetz et al. | May 26, 1942 |
| 2,425,754 | Murphree et al. | Aug. 19, 1947 |
| 2,526,524 | Welty | Oct. 17, 1950 |
| 2,717,860 | Rex | Sept. 13, 1955 |
| 2,721,167 | Nicholson | Oct. 18, 1955 |
| 2,752,288 | Voorhies et al. | June 26, 1956 |
| 2,758,959 | Nicolai | Aug. 14, 1956 |
| 2,763,600 | Adams et al. | Sept. 18, 1956 |
| 2,789,082 | Barr et al. | Apr. 16, 1957 |